United States Patent Office 3,249,429
Patented May 3, 1966

3,249,429
TANTALUM BRAZING ALLOY
Clo E. Armantrout, Corvallis, and John S. Howe, Jr., Albany, Oreg., and Charles A. Javorsky, Los Alamos, N. Mex., assignors to the United States of America as represented by the United States Atomic Energy Commission
No Drawing. Filed Dec. 27, 1963, Ser. No. 334,059
3 Claims. (Cl. 75—174)

The invention described herein was made in the course of, or under, Contract AT(11-1)-599 with the United States Atomic Energy Commission.

The present invention relates to an alloy of tantalum and, more particularly, to an alloy containing a predominant proportion of tantalum and minor proportions of titanium, columbium and tungsten which is especially useful for joining tantalum and/or tantalum base alloys.

Tantalum metal is highly useful for a large variety of purposes such as in the chemical and electrical industries due to chemical inertness, high melting point, excellent mechanical properties, unique adsorption and electrolytic properties. The joining of tantalum is troublesome due to the high melting point and difficulty in obtaining ductile, high strength joints while maintaining other desirable properties including corrosion and oxidation resistance at high temperature.

It has now been found that predominant proportions of tantalum as the base material with varying lesser proportions of titanium, columbium and tungsten combined therewith provide alloys possessing excellent properties, per se, and providing especially desirable properties when used for joining structural elements formed of tantalum and/or tantalum base alloys. The alloy possesses exceptional ductility and has better oxidation resistance than tantalum metal itself.

Accordingly it is an object of this invention to provide a new and improved alloy of tantalum.

Another object of this invention is to provide an alloy consisting predominantly of tantalum which is useful for the fusion joining or brazing of tantalum metal and/or tantalum base alloy structural components.

Still another object of the invention is to provide an alloy comprising predominant proportions of tantalum with lesser amounts of titanium, columbium and tungsten having high ductility and good oxidation resistance.

A further object of the invention is to provide an alloy comprising a predominant proportion of tantalum with about 20% by weight of titanium, about 5% by weight of columbium and 3% by weight of tungsten which is useful for producing fusion joints between tantalum metal and/or tantalum base alloys.

A still further object of the invention is to provide an alloy comprising essentially about 20% by weight of titanium, about 5% by weight of columbium and 3% by weight of tungsten useful, per se, and especially useful for producing brazed or other fusion joints between tantalum metal and/or tantalum base alloy structural elements having high ductility and good oxidation resistance.

Other objects and features of advantage will be apparent in the following description of the invention.

In accordance with the invention tantalum is combined in the molten state with about 20% titanium, about 5% columbium and 3% tungsten to provide a preferred alloy, said proportions being percentage by weight; the aforesaid alloy is especially useful for the fusion welding or brazing of tantalum and/or tantalum base alloys to provide joints having high ductility even at room temperature and possessing oxidation resistance at high temperatures superior to tantalum metal itself. The composition of the alloy may, however, be varied somewhat from the specific values indicated for the preferred composition, supra, as indicated in the following table:

|  | Preferred Composition, Percent by wt. | Composition Range, Percent by wt. |
|---|---|---|
| Tantalum | 72 | 80-64 |
| Titanium | 20 | 15-25 |
| Columbium | 5 | 3-7 |
| Tungsten | 3 | 2-4 |

It is preferred that the components be combined by melting in an inert atmosphere or otherwise with limited access to air such as in a vacuum melting furnace. The alloy is then cast or otherwise formed into ingots, rods or wire suitable for use in fusion welding or brazing, preferably as in an arc welding process in an inert atmosphere, e.g., helium or argon, with a non-consumable electrode, such as of tungsten. The ingots may also be rolled into plates and other structural elements for fabrication use.

Alloys of the preferred composition have been found to possess what may be considered to be typical and exemplary characteristics and properties as indicated hereinafter. As typically utilized for joining ductile tantalum metal and/or tantalum base alloys, a strip of the alloy of the invention is placed in contact with the joint, e.g., between tantalum metal plates, to be welded or brazed. The joint is then fused as by means of an electrical discharge applied with a tungsten electrode in an inert atmosphere.

As-cast button-size ingots are ductile to rolling fabrication procedures at room temperature. Oxidation resistance at high temperatures is much superior to pure tantalum metal. The hardness of the alloy is Rockwell A 58 in contrast to a hardness of Rockwell A 35 to 45 for pure ductile tantalum. Such hardness is indicative of a greater tensile strength for the alloy than that of tantalum. Brazed joints were bent without cracking and reductions of 50% by cold rolling were made without difficulty.

While there has been disclosed in the foregoing what may be considered to be preferred embodiments of the invention, modifications may be made therein without departing from the teachings of the invention and it is intended to cover all such as fall within the scope of the appended claims.

What is claimed is:

1. A tantalum base alloy especially useful for brazing tantalum and/or tantalum base alloys consisting essentially of about 15 to 25% by weight of titanium, about 3 to 7% by weight of columbium, about 2 to 4% by weight of tungsten with the remainder being tantalum.

2. A tantalum base alloy especially useful for brazing tantalum and/or tantalum base alloys consisting essentially of 64 to 80% by weight of tantalum, 15 to 25% by weight of titanium, 3 to 7% by weight of columbium and 2 to 4% by weight of tungsten.

3. A tantalum base alloy especially useful for brazing or welding tantalum metal and/or tantalum base alloys consisting essentially of about 72% by weight of tantalum, about 20% by weight of titanium, about 5% by weight of columbium and about 3% by weight of tungsten.

References Cited by the Examiner

UNITED STATES PATENTS 3,128,178  4/1964  Duffek _____ 75—174
3,161,503  12/1964  Lenning _____ 75—174

FOREIGN PATENTS 201,297  12/1958  Austria.
933,712  8/1963  Great Britain.

DAVID L. RECK, *Primary Examiner.*

W. C. TOWNSEND, C. N. LOVELL,
*Assistant Examiners.*